US011870135B2

(12) United States Patent
Saleh

(10) Patent No.: US 11,870,135 B2
(45) Date of Patent: Jan. 9, 2024

(54) DUAL RESONANT WEARABLE ANTENNA

(71) Applicant: Imam Abdulrahman Bin Faisal University, Dammam (SA)

(72) Inventor: Gameel Saleh Mohammed Saleh, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 166 days.

(21) Appl. No.: 17/568,426

(22) Filed: Jan. 4, 2022

(65) Prior Publication Data

US 2023/0216181 A1 Jul. 6, 2023

(51) Int. Cl.
*H01Q 1/27* (2006.01)
*H01Q 9/30* (2006.01)
*H01Q 1/38* (2006.01)

(52) U.S. Cl.
CPC ............... *H01Q 1/273* (2013.01); *H01Q 1/38* (2013.01); *H01Q 9/30* (2013.01)

(58) Field of Classification Search
CPC ............ H01Q 1/273; H01Q 1/38; H01Q 9/30; H01Q 1/44; H01Q 1/36
See application file for complete search history.

(56) References Cited

U.S. PATENT DOCUMENTS

2007/0285324 A1* 12/2007 Waterhouse ........... H01Q 1/273 343/718
2014/0159959 A1 6/2014 Rhoads et al.
2015/0048981 A1* 2/2015 Choi .................... H01Q 9/0407 343/718
2016/0049723 A1 2/2016 Baks et al.
2016/0190704 A1 6/2016 Celik

FOREIGN PATENT DOCUMENTS

CN 209434397 U 9/2019
IN 201611002456 7/2017

OTHER PUBLICATIONS

Ali, et al. ; Design and comparative analysis of conventional and metamaterial-based textile antennas for wearable applications ; Int J Numer Model 2019; 32 ; 17 Pages

* cited by examiner

*Primary Examiner* — David E Lotter
(74) *Attorney, Agent, or Firm* — Oblon, McClelland, Maier & Neustadt, L.L.P.

(57) ABSTRACT

A resonant wearable antenna system includes a ground plane and an antenna structure positioned over the ground plane. The ground plane includes a first cloth substrate and an array of metamaterial (MTM) unit cells positioned on the substrate. At least one MTM unit cell includes four four-leaf-clover units arranged in a four-leaf-clover pattern and connected to a center unit. Each four-leaf-clover unit includes four leaf units arranged in a four-leaf-clover pattern and connected to a subcenter unit. The antenna structure includes a second cloth substrate and a conductive pattern positioned over the second cloth substrate. The antenna structure is configured to have a first resonant frequency below 1 GHz and a second resonant frequency higher than the first resonant frequency. The array of MTM unit cells is configured to reflect incident waves, from the antenna structure at the first resonant frequency and the second resonant frequency, in-phase.

20 Claims, 11 Drawing Sheets

DUAL RESONANT WEARABLE ANTENNA

STATEMENT REGARDING PRIOR DISCLOSURE BY THE INVENTORS

Aspects of the present disclosure are related to "Dual Resonant Wearable Metamaterial for Medical Applications," Gameel Saleh, *International Journal on Communications Antenna and Propagation* (I.Re.C.A.P.), vol. 11, no. 2 (April 2021) incorporated herein by reference in its entirety.

BACKGROUND

Technical Field

The present disclosure is directed to wearable technology and, more specifically, is directed to a dual resonant wearable antenna system having a reflective ground plane structure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent developments in Wireless Body Area Networks (WBAN) have rapidly advanced to support a variety of medical applications. The tracking of medical equipment, the logging of treatment in hospitals, and the monitoring of rescue systems in emergency rooms are all among applications found for these systems. The United States Centers for Disease Control and Prevention (CDC) have additionally emphasized the importance of remote monitoring of vital signs during and beyond the COVID-19 pandemic in order to reduce staff exposure to patients and to minimize the impact of patient surges on facilities.

Wearable antennas are key elements in many developing WBAN systems, and often use materials that are flexible and/or otherwise able to wrap around a part of the body. However, wearable antennas suffer from design limitations, with a non-exclusive list including electromagnetic coupling between the antenna and the wearer, aspects of the physical deformation when placed over different wearers or different portions of the wearer, as well as challenges in fabrication. Various approaches have been taken in order to remedy these limitations, such as textile wearable antennas or flexible polyimide-based planar designs.

In order to avoid potential health hazards, the electromagnetic interaction of wearable antennas with human bodies are routinely monitored (i.e., in light of proximity to the human body). Designs reduce those interactions to maintain acceptable standard values. Moreover, borrowing from the development of various imaging technologies, human body "phantoms" of different geometries and tissue complexities have been implemented to understand body-radiation interactions with minimal risk to human test subjects while avoiding inconsistencies with other forms of testing (such as using cadavers or non-human testing).

Metamaterials (MTM) are one solution considered and used to minimize harmful interactions between antennas and wearers. Some metamaterials can reflect the antenna incident waves in-phase, rather than out-of-phase as in the metallic reflectors. These MTMs enhance the radiation efficiency, the directivity, and reduce the backward radiation into the body. In addition, certain metamaterials minimize the Specific energy Absorption Rate (SAR), which enables the safe use of more power. Increased power, in turn, increases the gain and the range of the wearable antennas. Various technologies and implementations of metamaterials have been explored, such as Artificial Magnetic Conductors (AMC), electromagnetic band gap (EBG) structures, High Impedance Surfaces (HIS), Frequency Selective Surfaces (FSS), and Composite Right Left-Handed (CRLH) transmission lines.

Developed solutions all rely on electromagnetic properties that are not readily available in nature. Antenna incident waves are designed to be reflected in an upward direction and suppress surface waves. This provides constructive rather than destructive interference with the antenna radiation. However, for low profile applications such as the wearable antennas used for WBAN systems, vias are not used, rendering the desired suppression properties at sought-after frequencies extremely difficult to achieve.

As an example, U.S. Patent Application 2016/0049723 discloses an antenna package structure configured to implement wireless communications. This antenna package structure fails to include MTM for reflecting waves upward. U.S. Patent Application 2016/0190704 describes a circularly polarized connected-slot antenna, mainly designed to receive radiation at global navigation satellite system frequencies. While the metamaterial ground plane of this reference may improve multipath performance over a wide bandwidth, the device described in this patent application does not reflect incident waves at two resonant frequencies in-phase.

In other examples, Chinese Patent 209434397U discloses a fabric antenna, which includes an upper surface of a conductive fiber, an ordinary fabric fiber material medium and a conductive fiber floor. The fabric antenna includes an MTM reflecting surface to reduce radiation absorption by human bodies, but again the patent's solution is not dual resonant. Ali et al. ("Design and comparative analysis of conventional and metamaterial-based textile antennas for wearable applications", Int. J. Numer. Model, 2019, 32:e2567) investigated four different configurations of a 2.4 GHz flexible microstrip patch wearable antenna. However, Ali's studies were also focused on a single resonant frequency at 2.4 GHz rather than dual resonant frequencies.

For medical, 5G, and wireless communication systems, innovators have designed both dual and triple band antennas. Meanwhile, Radio frequency Identification (RFID) is one of the specific applications best suited to wearable antennas. But solutions suitable for all of these bands remain elusive. As an example, Indian Patent Application 2016/11002456 describes an MTM-based bow-tie antenna for multi-frequency applications. In that patent application, the multi-frequency applications are specified to fall in the range of 1.6-6.7 GHz. Other dual resonant metamaterial antennas have been designed to work at the resonant frequencies germane to Digital Cellular System (DCS), Global System for Mobile telecommunications (GSM800) and Wideband Code Division Multiple Access (WCDMA) protocols. Still other solutions exist for technologies above 9 GHz or at terahertz frequencies.

Each of the aforementioned metamaterial-inspired antennas suffers from one or more drawbacks hindering their adoption. Accordingly, it is one object of the present disclosure to provide methods and systems for dual resonant antennas safely operating for use as a wearable, while simultaneously tuned to the proper frequencies and with suitable performance characteristics (e.g., gain, reflection, and loss parameters).

SUMMARY

In an exemplary embodiment, a resonant wearable antenna system includes a ground plane and an antenna structure positioned over the ground plane. The ground plane includes a first cloth substrate and an array of metamaterial (MTM) unit cells positioned on the substrate. At least one MTM unit cell includes four four-leaf-clover units arranged in a four-leaf-clover pattern and connected to a center unit. Each four-leaf-clover unit includes four leaf units arranged in a four-leaf-clover pattern and connected to a subcenter unit. The antenna structure includes a second cloth substrate and a conductive pattern positioned over the second cloth substrate. The antenna structure is configured to have a first resonant frequency below 1 GHz and a second resonant frequency higher than the first resonant frequency. The array of MTM unit cells is configured to reflect incident waves from the antenna structure at the first resonant frequency and the second resonant frequency, in-phase.

In some embodiments, the leaf units are rectangular areas defined by an MTM. In certain embodiments, the four respective leaf units within each four-leaf-clover unit are asymmetric. In embodiments, neighboring leaf units within a given four-leaf-clover unit have different lateral dimensions, and two non-neighboring leaf units within the given four-leaf-clover unit have identical lateral dimensions.

In some embodiments, the center unit is a cross-shaped area defined by the MTM. In certain embodiments, the four four-leaf-clover units within the at least one MTM unit cell are asymmetric. In some embodiments, the array of MTM unit cells includes four MTM unit cells positioned adjacent to one another and arranged in two rows and two columns.

In certain embodiments, the array of MTM unit cells includes an MTM that can be bent through at least 90 degrees without cracking or breaking. In some embodiments, the first cloth substrate is insulating and can be bent through at least 90 degrees without cracking or breaking, and the second cloth substrate is insulating and can be bent through at least 90 degrees without cracking or breaking. In certain embodiments, the first cloth substrate includes at least one of felt, denim, or fabric, and the second cloth substrate includes at least one of felt, denim, or fabric. In embodiments, the system can further include a foam material positioned between the antenna structure and the ground plane.

In certain embodiments, the system can include a conductive plane positioned below the first cloth substrate. In some embodiments, the array of MTM unit cells and the conductive plane include a same conducting material. In embodiments, the array of MTM unit cells and the conductive pattern of the antenna structure can be a same conducting material. In some embodiments, the antenna structure is adhered to a central area of the ground plane.

In certain embodiments, the MTM unit cell includes a first RLC circuit and a second RLC circuit. The first RLC circuit can have a first resistor, a first inductor and a first capacitor serially connected. The first inductor and the first capacitor can form a first LC circuit. The second RLC circuit can have a second resistor, a second inductor and a second capacitor serially connected. The second inductor and the second capacitor can form a second LC circuit. In some embodiments, the second RLC circuit is connected across the first LC circuit by connecting the second resistor with the first inductor and connecting the second capacitor with the first capacitor. In certain embodiments, the first RLC circuit is configured to receive a first voltage, and the second LC circuit is configured to output a second voltage.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
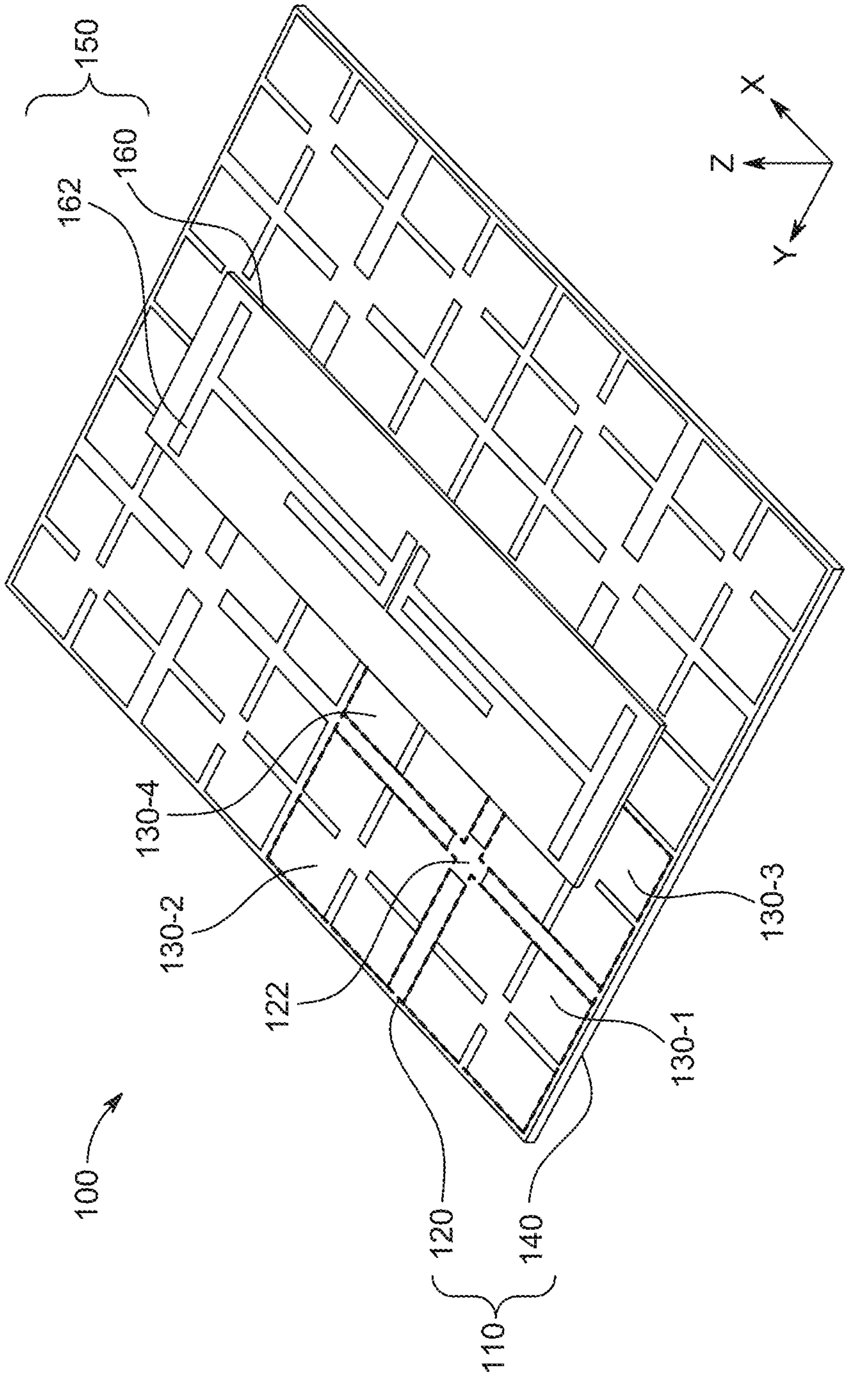
FIG. 1 is a schematic diagram of a dual resonant antenna system, according to certain embodiments.

In the drawings, like reference numerals designate identical or corresponding parts throughout the several views. Further, as used herein, the words “a,” “an” and the like generally carry a meaning of “one or more,” unless stated otherwise.

Furthermore, the terms “approximately,” “approximate,” “about,” and similar terms generally refer to ranges that include the identified value within a margin of 20%, 10%, or preferably 5%, and any values therebetween.

Aspects of this disclosure are directed to antenna systems using a wearable dual resonant metamaterial (MTM) that operates at two resonant frequencies. In some embodiments, the proposed antenna system operates at both the UHF-RFID frequency band (915 MHz, e.g., 902-928 MHz) and the WLAN frequency band (2.45 GHz, e.g., 2.4-2.5 GHz).

Both frequencies are used for RFID applications in the U.S. and Europe. The antenna system operates at the UHF-RFID, in part, due to the proposed structures, despite the challenges presented by the inversely proportional relationship between the size and frequency.

The geometry of the above and below described metamaterial (i.e., the dual band electromagnetic band gap structure) allows the structure to reflect the signal in-phase rather that out-of-phase (as in metallic ground planes). The described metamaterial is flexible and can be worn without restricting movement, while at the same time improving the gain and the front-to-back ratio (FBR) of the antenna. The disclosed designs also allow for acceptable transmission performance and characteristics, despite the ability of the metamaterial to bend. The MTM-backed antenna reduces Specific energy Absorption Rates (SAR) at the two frequencies by at least 80%, preferably at least 90%, preferably about 94% of their initial values when compared to using the antenna without the MTM. These performance characteristics allow for the described systems and structures to be safely used in RFID applications with higher power, and at the same time improve the gain and the range of the RFID antenna tags and readers. The proposed dual resonant structure has been designed to work in the Industrial, Scientific, and Medical (ISM) frequency bands.

FIG. 1 shows a dual resonant antenna system 100, according to embodiments of the present application. The dual resonant antenna system 100 (or simply "antenna system 100") is a multi-layer structure including a wearable dual resonant metamaterial (MTM) described above and below. The antenna system 100 includes a ground plane 110 and a dual resonant antenna structure 150 (alternatively "dual resonant antenna 150" or simply "antenna 150") positioned thereon.

The ground plane 110 includes an array of MTM unit cells 120, each of which includes a center unit 122 connecting four four-leaf-clover units 130 (or simply "clover units 130", individually numbered as 130-1, 130-2, 130-3, and 130-4). In an embodiment, the MTM unit cells 120 are positioned adjacent to one another and arranged in two rows and two columns. The array of metamaterial (MTM) unit cells 120 are positioned on a first cloth substrate 140. The first cloth substrate 140 is a felt material in some embodiments. In certain embodiments, the first cloth substrate 140 has a thickness of 2 mm, along with a dielectric constant ($\varepsilon_{65}$ ) of 1.38 and a tangent loss tan (δ) of 0.003. The ground plane 110 can further include a conductive plane below the cloth substrate 140, not shown or numbered in FIG. 1, but described in further detail below with respect to FIGS. 3 and 4. The ground plane 110 grounds the antenna system 100 for proper performance with a highly conductive material fashioned in the repeating pattern of the MTM unit cells 120.

"Cloth" as used herein generally refers to felt, fabric, denim and the like. Cloth can include a material such as fibers (synthetic or natural), cotton, wool and the like. Cloth may be woven or unwoven, or knitted. For example, cloth includes, but is not limited to, knitted natural fibers, woven cotton, non-woven polymer fibers (e.g. Tyvek by DoPont), and the like. "Cloth substrate" as used herein generally refers to any substrate made up of at least 50% of cloth by weight.

In certain embodiments, a conductive material of the ground plane 110 (e.g., the conductive material of the MTM unit cells 120) has a conductivity (σ) over $1.0\times10^5$ S/m, preferably about $1.8\times10^5$ S/m. In some embodiments, the MTM unit cells 120 include ShieldIt, commercially available from InterEFS of Baltimore, Md. In some embodiments, the MTM unit cells 120 may include other conductive materials such as Copper, Flectron, Zelt and the like, of suitable thickness. In certain embodiments, the conductive material of the ground plane 110 has a thickness of 0.17 mm.

The antenna structure 150 is configured to have a first resonant frequency below 1 GHz, preferably 850-950 MHz, and a second resonant frequency higher than the first resonant frequency, preferably 2.0-6.0 GHz, preferably 2.43-2.47 GHz. The array of MTM unit cells 120 is configured to reflect incident waves, from the antenna 150 at the first resonant frequency and the second resonant frequency, in-phase. In some embodiments, the antenna system 100 is operable at the 915 MHz (UHF-RFID) and 2.45 GHz (WLAN) frequency bands based on the configuration of the antenna 150. The antenna 150 (also shown in further detail in FIG. 2 and described below), has been designed for energy harvesting, as well as for use as a wearable antenna for RFID and Wireless Body Area Network (WBAN) applications, according to some embodiments.

The antenna structure 150 includes a second cloth substrate 160 and a conductive pattern 162 positioned over the second cloth substrate 160. The second cloth substrate 160 (or simply "substrate 160") is a denim material in some embodiments. In certain embodiments, the substrate 160 is denim with a thickness of 1.2 mm, having a dielectric constant ($\varepsilon_\gamma$) of 1.7 and a tangent loss tan (δ) of 0.002. In alternative embodiments, the substrate 160 can be one of felt, or fabric. In some embodiments, a foam material (not shown or numbered in FIG. 1) is positioned between the antenna structure 150 and the ground plane 110. The foam material can have a dielectric constant ($\varepsilon_\gamma$) of 1.05, according to some embodiments.

Figure 2:
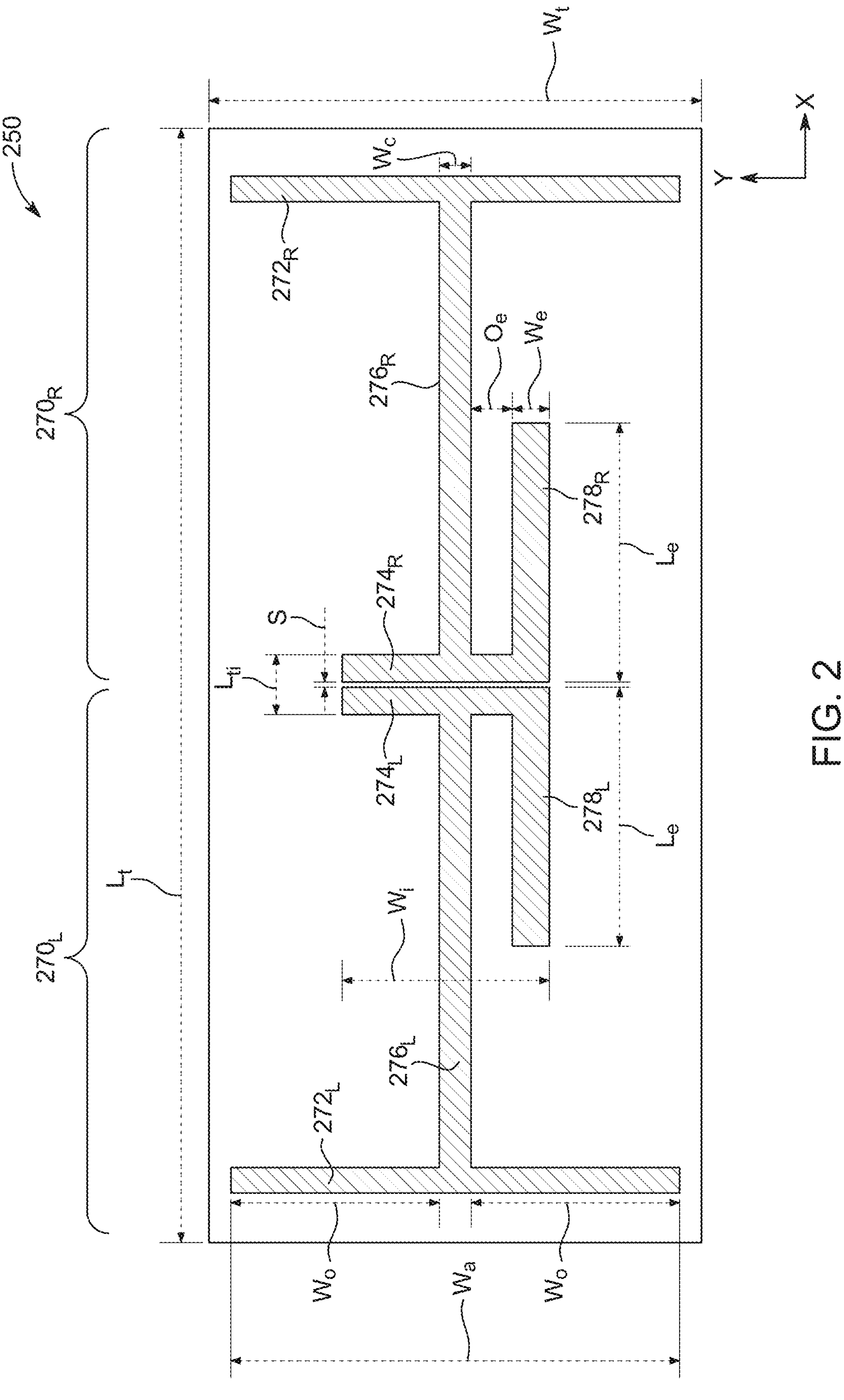
FIG. 2 is a schematic diagram of a dual resonant antenna, according to certain embodiments.

Turning to FIG. 2, more specific features and dimensions of a dual resonant antenna structure 250 (or "antenna 250") are depicted. The antenna 250 is shown in FIG. 2 as seen from above. The overall dimensions of dual resonant antenna structure 250 are denoted as $L_t$ and $W_t$. In some implementations, $L_t$ can be 113.36 mm, while $W_t$ can be 39.4 mm.

The antenna 250 is shown with halves of the conductive pattern 162 that mirror each other, denoted as $\mathbf{270}_L$ and $\mathbf{270}_R$. The halves of the conductive pattern 162 can be separated by a proportionally small distance, denoted as S. In some embodiments, S is a distance of 0.4 mm.

The antenna 250 includes a first outer portion $\mathbf{272}_L$ and a second outer portion $\mathbf{272}_R$, each having a width denoted as $W_a$. The antenna 250 also includes a first inner portion $\mathbf{274}_L$ and a second inner portion $\mathbf{274}_R$, each being the closest portion of one half of the conductive pattern 162 to the other. In other words, the first inner portion $\mathbf{274}_L$ and the second inner portion $\mathbf{274}_R$ are separated by the distance S. The inner portions 274 can have a width, denoted as $W_i$, of 16.59 mm.

The antenna 250 further includes a first central portion $\mathbf{276}_L$, which connects the first outer portion $\mathbf{272}_L$ and the first inner portion $\mathbf{274}_L$. Extending from one end of the first inner portion $\mathbf{274}_L$ is a first end portion $\mathbf{278}_L$. In a symmetrical fashion, the antenna 250 also includes a second central portion $\mathbf{276}_R$, which connects the second outer portion $\mathbf{272}_R$ and the second inner portion $\mathbf{274}_R$. Extending from one end of the second inner portion $\mathbf{274}_R$ is a second end portion $\mathbf{278}_R$. The second end portion $\mathbf{278}_R$ extends from the same end as the respective end of the first inner portion $\mathbf{274}_L$ from which the first end portion $\mathbf{278}_L$ extends. The end portions 278 are offset from the central portions 276, as shown by $O_e$ in FIG. 2, which can be 3.09 mm in certain embodiments.

In some embodiments, $W_a$ can be 35.80 mm. In implementations, a width of the central portions ($\mathbf{276}_L$ and $\mathbf{276}_R$), denoted as $W_c$, can be 2.60 mm. As the antenna 250 is symmetric about the inner portions, each outer portion (272) extends a distance 16.60 mm, denoted as $W_o$, from the respective central portion (276) (i.e., $W_a=W_c+2W_o$).

The end portions $\mathbf{278}_L$ and $\mathbf{278}_R$ can each have a length and a width, denoted as $L_e$ and $W_e$, respectively. In certain embodiments, $L_e$ can be 26.44 mm and $W_e$ can be 3.20 mm. In some embodiments, and the combined length of the first inner portion $\mathbf{274}_L$, the second inner portion $\mathbf{274}_R$, and the separation distance S can be denoted as $L_{ti}$. In certain embodiments, $L_{ti}$ can be 6.14 mm. Note that dimensions (e.g. $L_t$, $W_t$, S, $W_a$, $W_c$, $W_o$, etc.) given above are just one embodiment for illustrative purposes. In other embodiments, the dimensions may vary.

Figure 3:
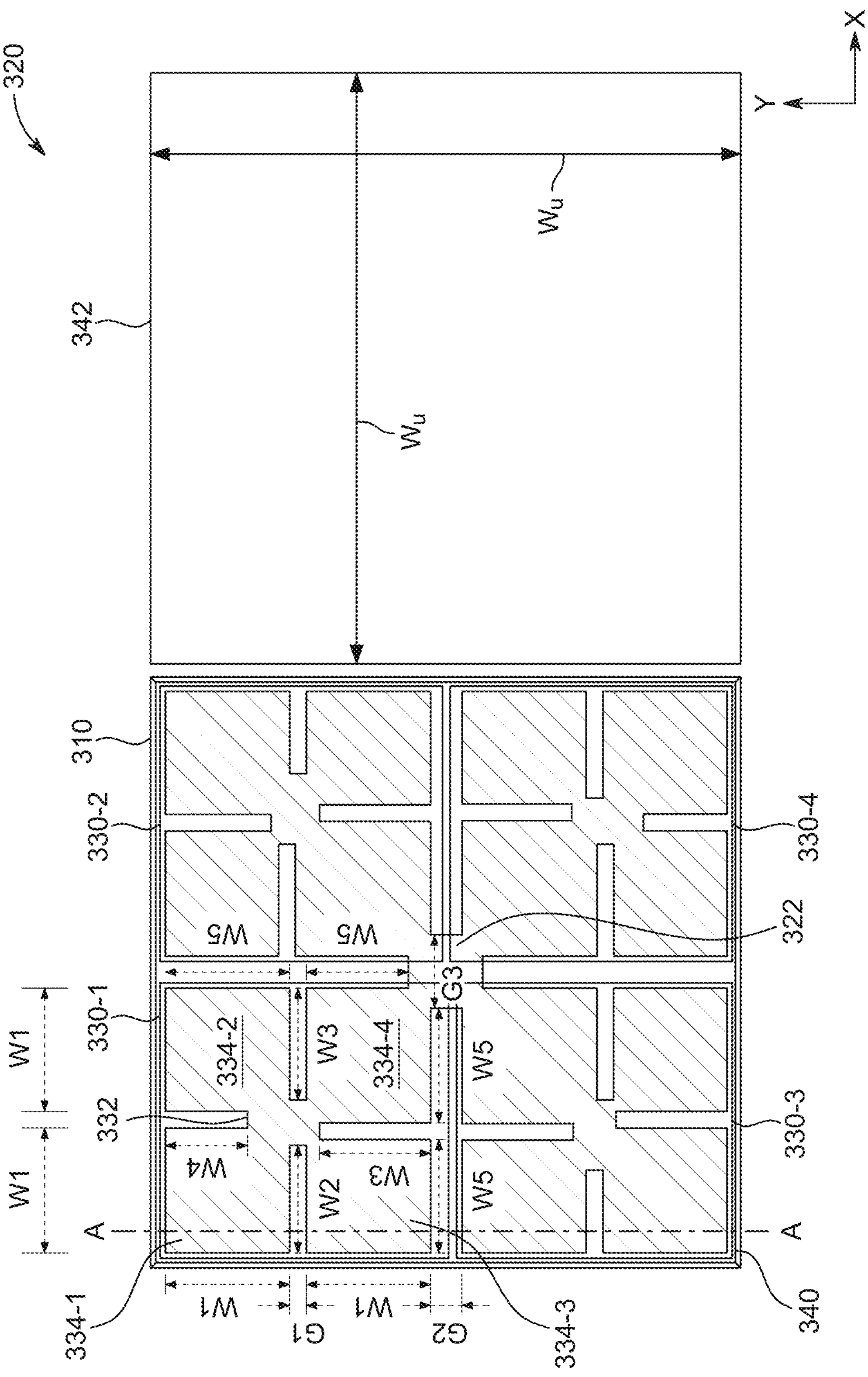
FIG. 3 is a ground plane for a dual resonant antenna system, according to certain embodiments.

The MTM unit cell 120 shown in FIG. 1 is depicted in further detail in FIG. 3 as a unit cell 320. The MTM unit cell 320 includes four four-leaf-clover units 330 (e.g. 330_1, 330_2, 330_3 and 330_4) similar to the arrangement of the four-leaf-clover units 130 in FIG. 1. The four-leaf-clover units 330 are arranged in a four-leaf-clover pattern and connected to a center unit 322. Each four-leaf-clover unit 330 includes four leaf units 334 (i.e., 334-1, 334-2, 334-3, and 334-4, labeled for only one four-leaf clover unit 330_1 for clarity and simplicity). Consider the four-leaf clover unit 330_1 for example. The four leaf units 334-1, 334-2, 334-3, and 334-4 are arranged in a four-leaf-clover pattern and connected to a subcenter unit 332. The leaf units 334-1, 334-2, 334-3, and 334-4 are rectangular areas defined by the MTM while the subcenter unit 332 is a (e.g. concave) polygonal area defined by the MTM. The leaf units 334-1, 334-2, 334-3, and 334-4 are asymmetric, according to certain embodiments. In some embodiments, neighboring leaf units 334 (e.g. 334_1 and 334_2) within the four-leaf-clover unit 330_1 have different lateral dimensions, and two non-neighboring leaf units 334 (e.g. 334_2 and 334_3) within the four-leaf-clover unit 330_1 have identical lateral dimensions.

In an example implementation, the outer dimensions of the leaf units 334 of the four-leaf-clover unit 330-1 of the MTM unit cell 310 shown in FIG. 3 can each have a dimension denoted by $W_1$. The inner dimensions of the leaf units 334 can be denoted as $W_2$, $W_3$, $W_3$, and $W_4$, as viewed in a counterclockwise direction around the individual four-leaf-clover unit 330 starting from the two left-hand leaf units 334 (i.e., 334-1 and 334-3). In some embodiments, $W_1$ can measure 15 mm, while $W_2$=12.8 mm, $W_3$=13.3 mm, and $W_4$=10 mm. An internal gutter dimension between each leaf unit 334 of the four-leaf clover can be denoted as $G_1$. In embodiments, $G_1$ is a 2 mm distance between each leaf unit 334 of the four-leaf-clover unit 330-1.

Continuing with the example depicted in FIG. 3, the four-leaf-clover units 330_2 and 330_3 which are adjacent to the four-leaf-clover unit 330-1 (corresponding to the four-leaf-clover units 130-2 and 130-3 as shown in FIG. 1) can each be separated from the four-leaf-clover unit 330-1 by an external gutter with a second dimension, denoted as $G_2$. In some embodiments, $G_2$ can be 4 mm. In certain embodiments, $G_2$ can be the distance between each of the four-leaf-clover units 330 of the unit cell 310. The leaf units 334 adjacent to the four-leaf-clover unit 330-1 can have a width denoted as $W_5$. In some embodiments, $W_5$ can be a value slightly less than the value of $W_1$. For example, $W_5$ can be 13.75 mm. The internal edges of the leaf units 334 of the four-leaf-clover unit 330-1 can also have a width of $W_5$. Thus, the adjacent leaf units 334 across the internal gutters of width $G_2$ each have a width of $W_5$.

The center unit 322 is a cross-shaped area defined by the MTM. The center unit 322 has a lateral dimension, represented by $G_3$. In some embodiments, $G_3$ can be a value less than 10 mm, for example 9 mm. Because each of the external gutters between the four four-leaf-clover units 330 can have a width of $G_2$, the line width of the center unit 322 can also be $G_2$. This is to say, the center unit 322 has a cross shape with two lines intersecting each other. The two lines each have a width $G_2$ of and a length of $G_3$.

MTM unit cell 310 can be constructed using ShieldIt superconducting material placed on a first cloth substrate 340 (corresponding to the first cloth substrate 140 from FIG. 1). In some embodiments, the first cloth substrate can be a 2 mm thick felt substrate. The dielectric constant ($\varepsilon_\gamma$) and the tangent loss tan (δ) of the felt can be 1.38 and 0.003, respectively, in some embodiments.

A conductive plane 342 can cover a rear side of the MTM unit cell 310 in some embodiments. For example, the conductive plane 342 can also be constructed from ShieldIt. The conductive plane 342 can have dimensions of $W_u$ by $W_u$ as measured in millimeters. In some embodiments, $W_u$ is 70 millimeters, thus covering an area slightly larger area than the four connected four-leaf-clover structures of unit cell 140.

Note that dimensions (e.g. $W_1$ $W_2$, $W_3$, $W_3$, $W_4$, $G_2$, $G_3$, $W_u$, etc.) given above are used as one example for illustrative purposes. In other embodiments, the dimensions may vary. For example, the center unit 322 can have the lateral dimension $G_3$ in the range of of 8-10 mm. The leaf units 334 can have a lateral dimension of 9-16 mm. Neighboring leaf units can be spaced apart from each other by 1-5 mm; that is, internal gutters can be 1-5 mm in width. The unit cell dimensions ($W_u$) can range between 60 and 80 millimeters.

Further, in other embodiments (not shown), the respective four leaf units 334 within one four-leaf-clover unit 330 may have symmetry, for example about an internal gutter and/or a diagonal direction. Besides, the four four-leaf-clover units 330_1, 330_2, 330_3 and 330_4 within one MTM cell 320 may have symmetry, for example about an external gutter and/or a diagonal direction.

Figure 4:
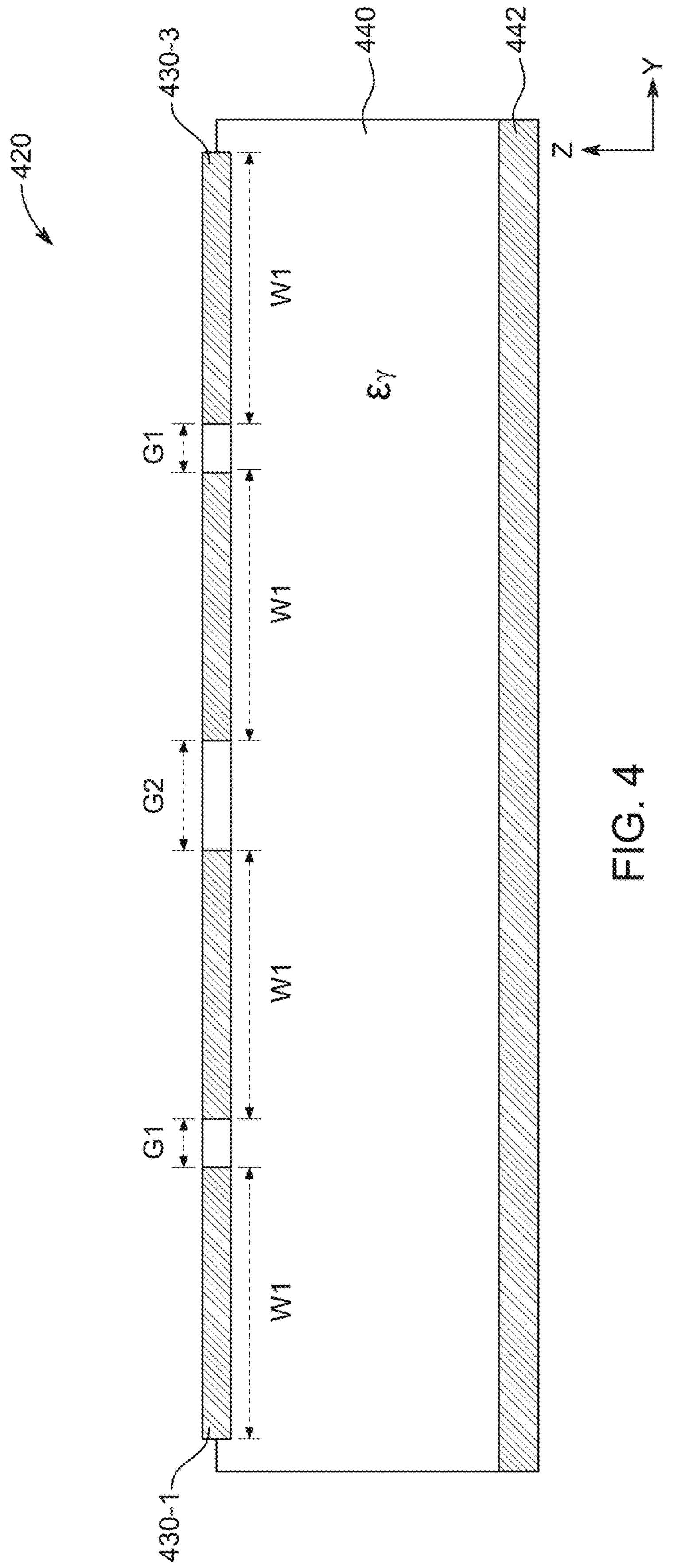
FIG. 4 is a cross-sectional view of a ground plane for a dual resonant antenna system, according to certain embodiments.

FIG. 4 is a cross-sectional view of an MTM unit cell 420 as seen along a line A of FIG. 3, according to certain embodiments. As seen in this view, two four-leaf-clover units 430-1 and 430-3 are shown, collectively referred to as four-leaf-clover units 430. The four-leaf-clover units 430 correspond to the four-leaf-clover units 130-1 and 130-3 in FIG. 1 as well as the equivalent four-leaf-clover units in FIG. 3.

The four-leaf-clover units 430 are positioned on a first cloth substrate 440, which corresponds to the first cloth substrate 140 described above. The first cloth substrate 440 can be a felt material in some embodiments. In certain embodiments, the first cloth substrate 440 has a thickness of 2 mm, along with a dielectric constant ($\varepsilon_\gamma$) of 1.38 and a tangent loss tan (δ) of 0.003. In alternative embodiments, the first cloth substrate 440 is at least one of denim, or fabric. The first cloth substrate 440 is insulating in some embodiments and can be bent through at least 90 degrees without cracking or breaking.

The first cloth substrate 440 is positioned on a conductive plane 442, substantially similar or identical to the conductive plane 342 described above in relation to FIG. 3. The conductive plane 342 can be made of a same material as the four-leaf-clover units 430. In some embodiments, the conductive plane 342 is a sheet of ShieldIt, with dimensions of $W_u$ by $W_u$.

Figure 5:
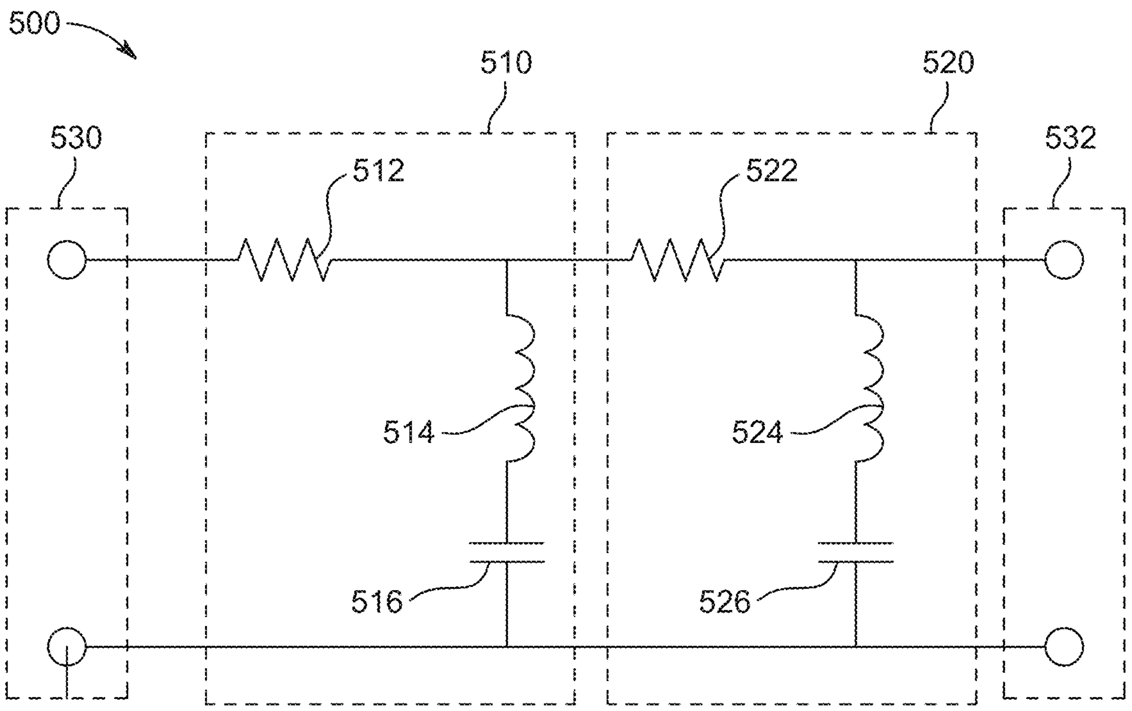
FIG. 5 is an equivalent circuit diagram of a MTM unit cell of a dual resonant antenna system, according to certain embodiments.

FIG. 5 is an equivalent circuit diagram 500 of the MTM unit cell 140 of the dual resonant antenna system 100, according to certain embodiments. In some embodiments, the circuit diagram 500 of MTM unit cell 120 includes a first RLC circuit 510 and a second RLC circuit 520. In embodiments, the first RLC circuit 510 is configured to receive a first voltage 530, and the second RLC circuit 520 is configured to output a second voltage 532.

As depicted in FIG. 5, first RLC circuit 510 includes a first resistor 512, a first inductor 514 and a first capacitor 516, each serially connected. The first inductor 514 and the first capacitor 516 can form a first LC circuit. The second RLC circuit 520 includes a second resistor 522, a second inductor 524 and a second capacitor 526, also each serially connected. The second inductor 524 and the second capacitor 526 can form a second LC circuit. In some embodiments, the second RLC circuit 520 is connected across the first LC circuit by connecting the second resistor 522 with the first inductor 514 and connecting the second capacitor 526 with the first capacitor 516.

Conventional single resonant structures were analyzed for expressions of parallel LC equivalent circuits when a plane wave of transverse electric polarization illuminated the metamaterial surface at normal incidence. The resonant frequencies of equivalent circuit 500 are modeled, based on those prior investigations, as shown below in Equations 1-4. The subscripts of equations 1-4 correspond to the first RLC circuit 510 and the second RLC circuit 520 as described above.

$$\omega_{01} = \frac{1}{\sqrt{(C_1\tilde{L}_1)}} \quad \text{Eq. 1}$$

$$\omega_{02} = \frac{1}{\sqrt{(C_2\tilde{L}_2)}} \quad \text{Eq. 2}$$

$$\tilde{L}_1 = \frac{L_1 + R_1}{j\omega} \quad \text{Eq. 3}$$

$$\tilde{L}_2 = \frac{L_2 + R_2}{j\omega} \quad \text{Eq. 4}$$

Figure 6:
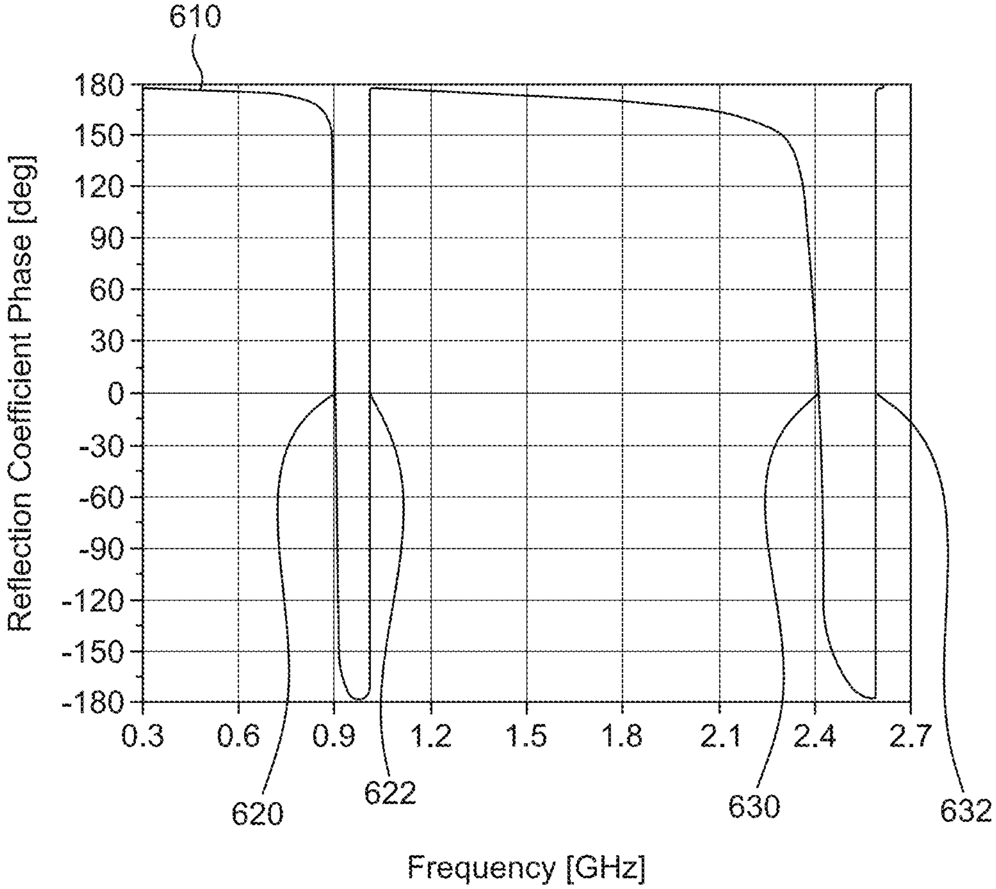
FIG. 6 is a graph of the simulated reflection coefficient phase of a dual resonant antenna system, according to certain embodiments.

Turning now to FIG. 6, a graph of the simulated reflection coefficient phase of a dual resonant antenna system 100 is depicted, according to certain embodiments. The array of MTM cells (such as the MTM unit cell 120 or 320) has a zero-degree reflection phase at four frequencies as seen in a plot 610. Denoted as 620 and 622 in FIG. 6, two of the resonant frequencies correspond to 900 MHz range. The second pair of resonant frequencies have zero-degree reflection phase at 2.45 and 2.6 GHz, shown as points 630 and 632, respectively. As shown by this plot, the metamaterial of the present application reflects incident waves upward in order to enhance the performance of the antenna with the dual bands at frequencies corresponding to ±90° reflection coefficient phase.

Figure 7A:
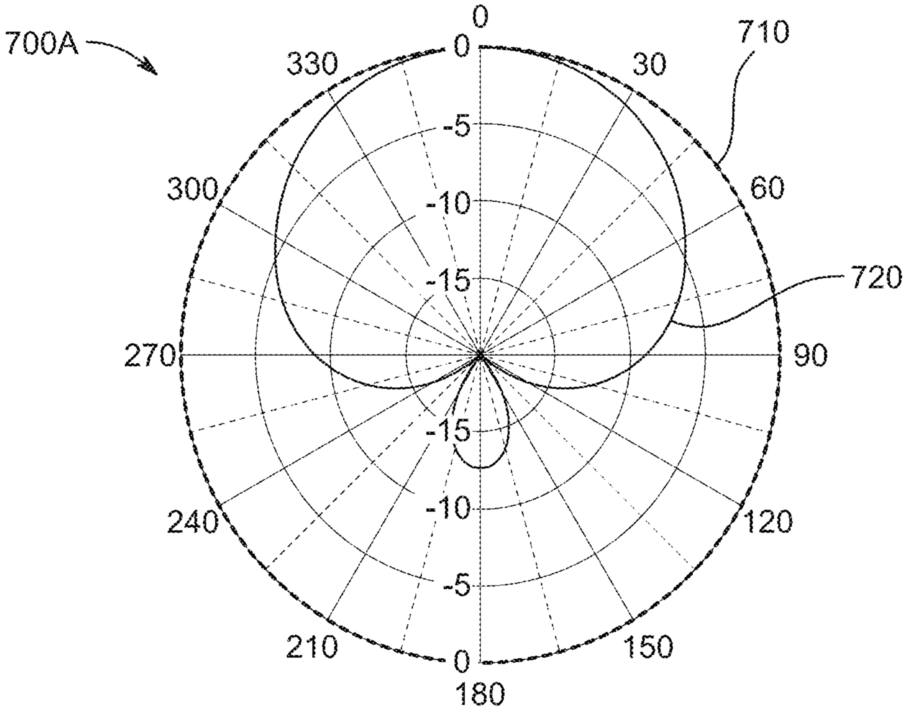
FIGS. 7A and 7B are E-plane and H-plane radiation patterns of a dual resonant antenna system at a specified frequency, with and without a metamaterial respectively, according to certain embodiments.
Figure 7B:
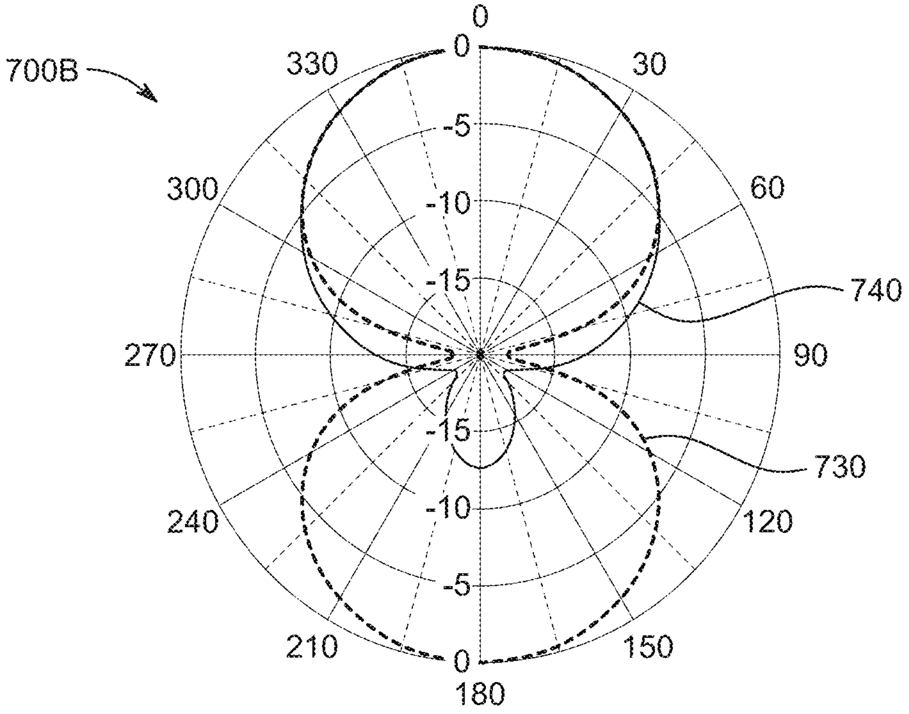

FIGS. 7A and 7B are H-plane and E-plane radiation patterns, respectively, of a dual resonant antenna at a specified frequency, according to certain embodiments. In this example, the radiation patterns are shown for 900 MHz. Each radiation pattern shows values with and without the metamaterial of the present application. Diagram 700A represents the H-plane radiation pattern without the metamaterial in curve 710, while curve 720 shows the characteristics of the antenna with the metamaterial. Diagram 700B represents the E-plane radiation pattern without the metamaterial in curve 730, while curve 740 shows the characteristics of the antenna with the metamaterial.

Figure 8A:
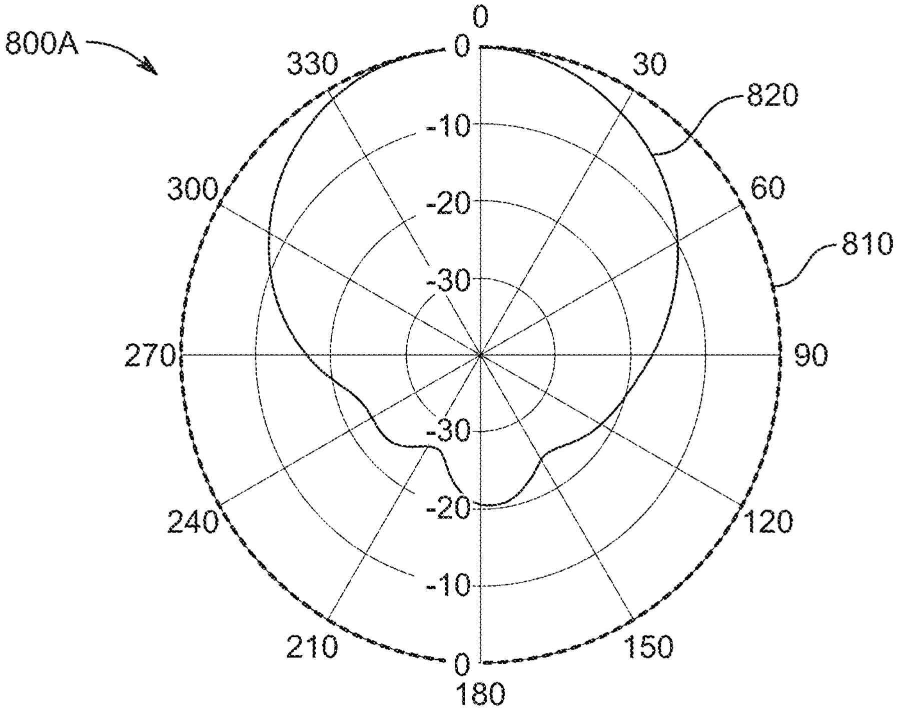
FIGS. 8A and 8B are E-plane and H-plane radiation patterns of a dual resonant antenna system at a specified frequency, with and without a metamaterial respectively, according to certain embodiments.
Figure 8B:
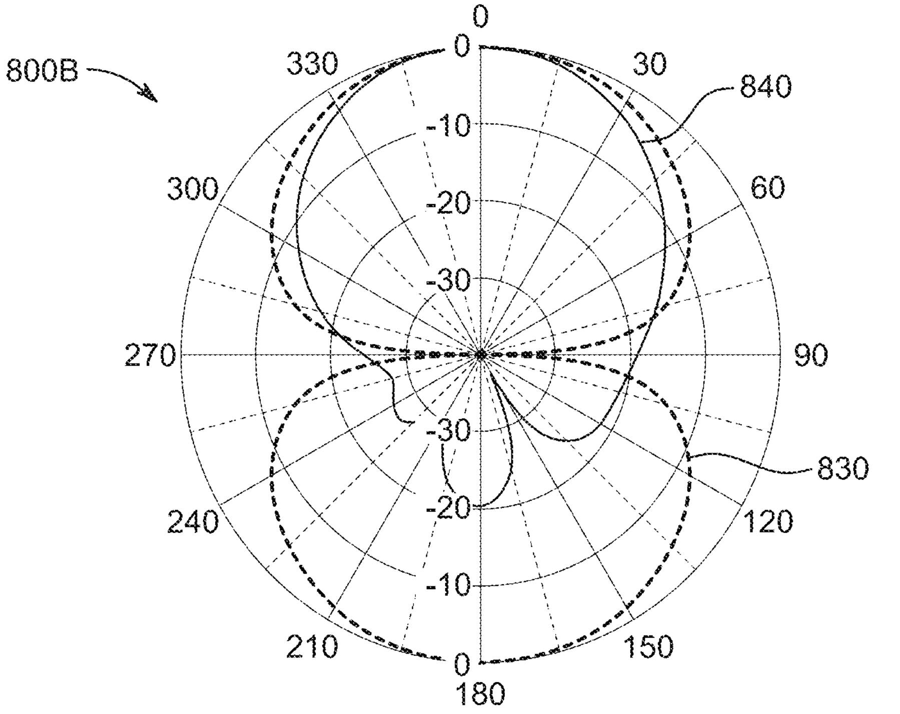

FIGS. 8A and 8B are H-plane and E-plane radiation patterns, respectively, of a dual resonant antenna at a second specified frequency, according to certain embodiments. In this example, the radiation patterns are shown for 2.4 GHz. Each radiation pattern shows values with and without the metamaterial of the present application. Diagram 800A represents the H-plane radiation pattern without the metamaterial in curve 810, while curve 820 shows the characteristics of the antenna with the metamaterial. Diagram 800B represents the E-plane radiation pattern without the metamaterial in curve 830, while curve 840 shows the characteristics of the antenna with the metamaterial.

As seen in diagrams 700A through 800B, the use of the metamaterial in resonant antenna system 100 reduces the radiation directed toward the body at the two operating frequencies. The reduction ranges from 20 dB to 12.5 dB for the H and E-planes, respectively. As a result, the gain of the antenna system 100 is enhanced. The improvement is up to 9.5 dBi at the higher resonant frequency (2.45 GHz) and 6.5 dBi at the lower resonant frequency (915 MHz), in a direction opposite to the body.

To test performance of the described dual resonant antenna system, the dual resonant antenna system 100 was first analyzed numerically over an inhomogeneous multi-layer phantom. The results were then compared experimentally by placing the dual resonant antenna system 100 on the human arm. The phantom was used to mimic 250 mm of human tissue from the upper arm. The phantom consists of skin, fat, muscle, and bone, with thicknesses and electromagnetic properties shown in Table 1. An E5063A vector network analyzer (from Keysight Technologies of Santa Rosa, Calif.) was used to measure the reflection coefficient at the two resonant frequencies of the metamaterial backed antenna (i.e., antenna system 100).

TABLE 1

| Layer | Conductivity (s/m) | Permittivity F/m) | Thickness (mm) | Density (kg/m$^3$) |
|---|---|---|---|---|
| Bone | 0.586055 | 15.0087 | 16.55 | 1850 |
| Skin | 1.4408 | 38.0629 | 2 | 1010 |
| Muscle | 1.77472 | 53.6391 | 32 | 1040 |
| Fat | 0.102343 | 5.285292 | 6 | 918 |

Figure 9:
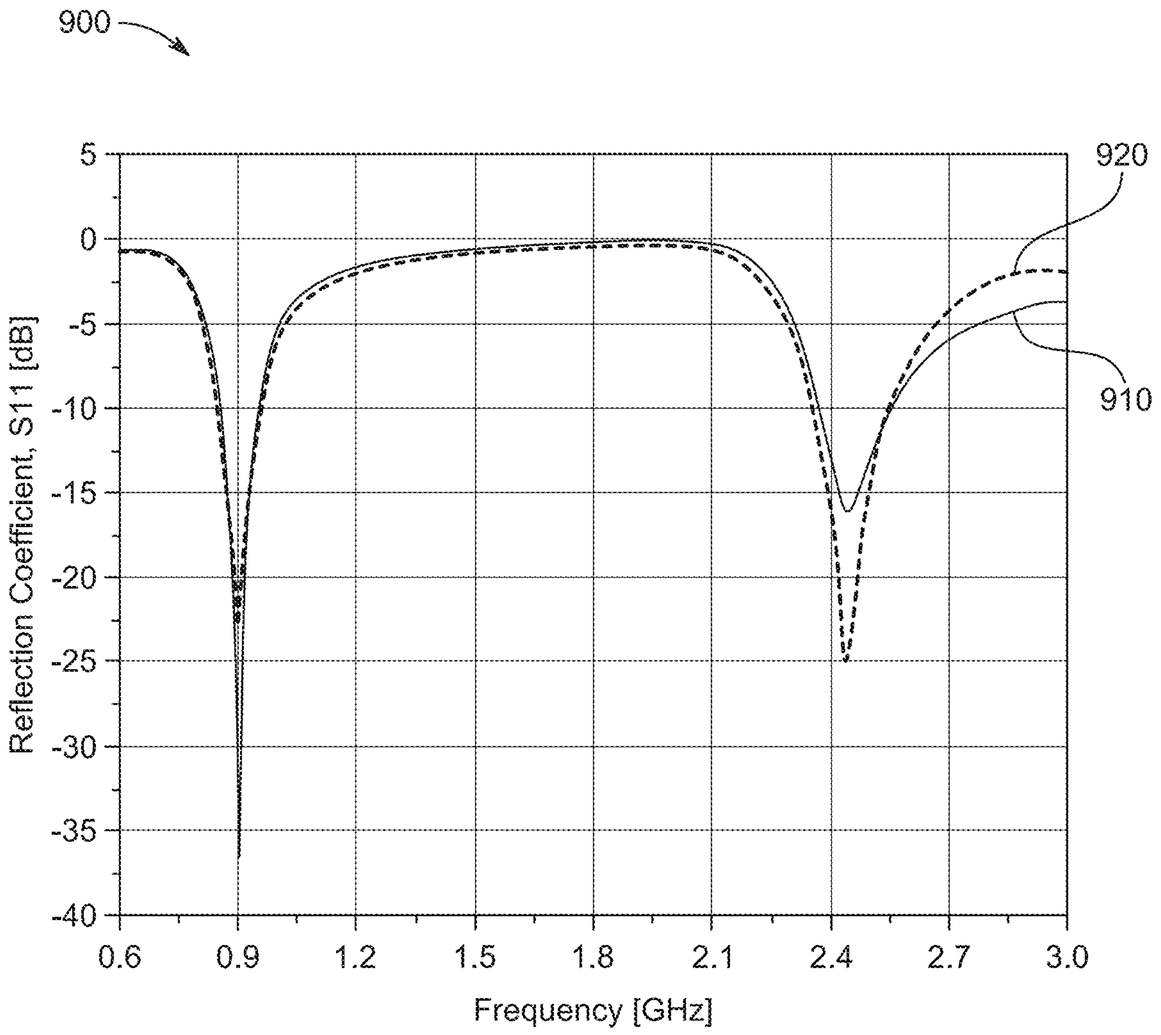
FIG. 9 is a graph of simulated and measured reflection coefficient values of a dual resonant antenna system with the metamaterial, according to certain embodiments.

FIG. 9 is a graph 900 of simulated and measured reflection coefficient ($S_{11}$) values of a dual resonant antenna with the metamaterial, according to certain embodiments. The simulated reflection coefficient values of the antenna system 100 on the phantom were −37 dB and −16 dB at 0.915 GHz and 2.45 GHz, respectively, as shown by solid line 910 in FIG. 9. When the dual resonant structure was placed on a human hand, the measured $S_{11}$ values are shown to be −23 dB and −25 dB at the lower and higher resonant frequencies, respectively, as shown by dashed line 920. Human body tissues, which typically produce a high dielectric effect, do not affect the performance of the above- and below-described antenna due to the existence of the metamaterial and the isolation the MTM creates between the body and the antenna.

Figure 10A:
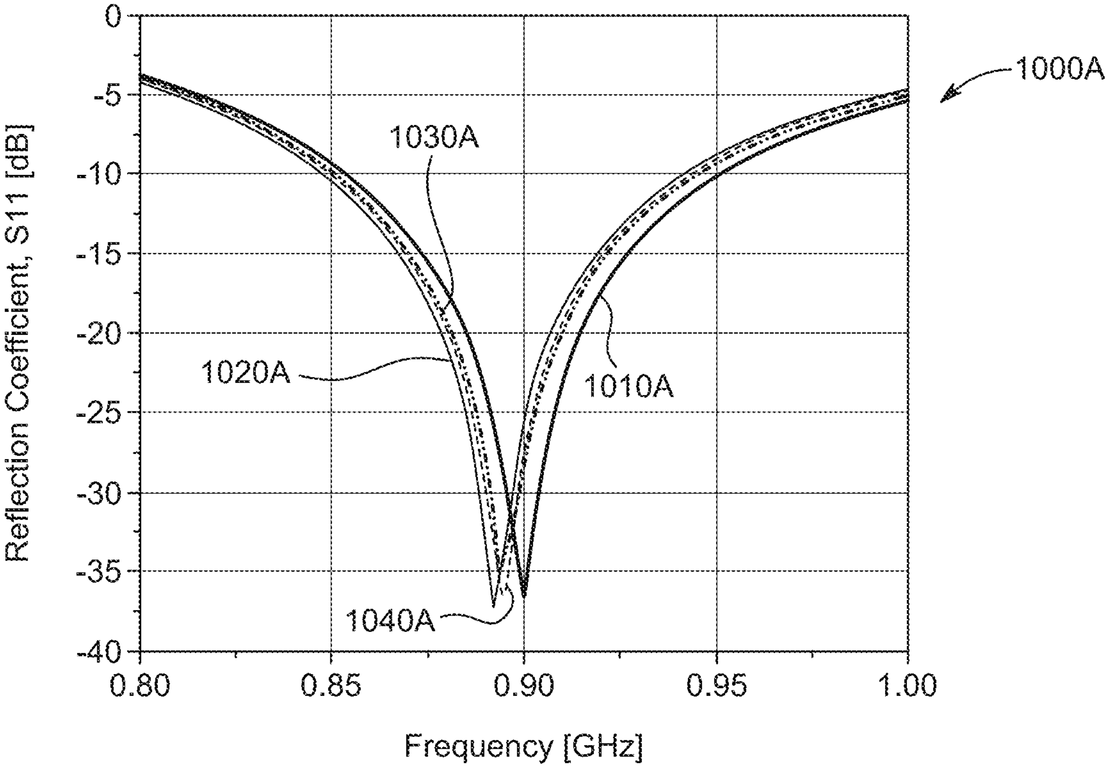
FIGS. 10A and 10B illustrate reflection coefficient values with different bending radii, according to certain embodiments.
Figure 10B:
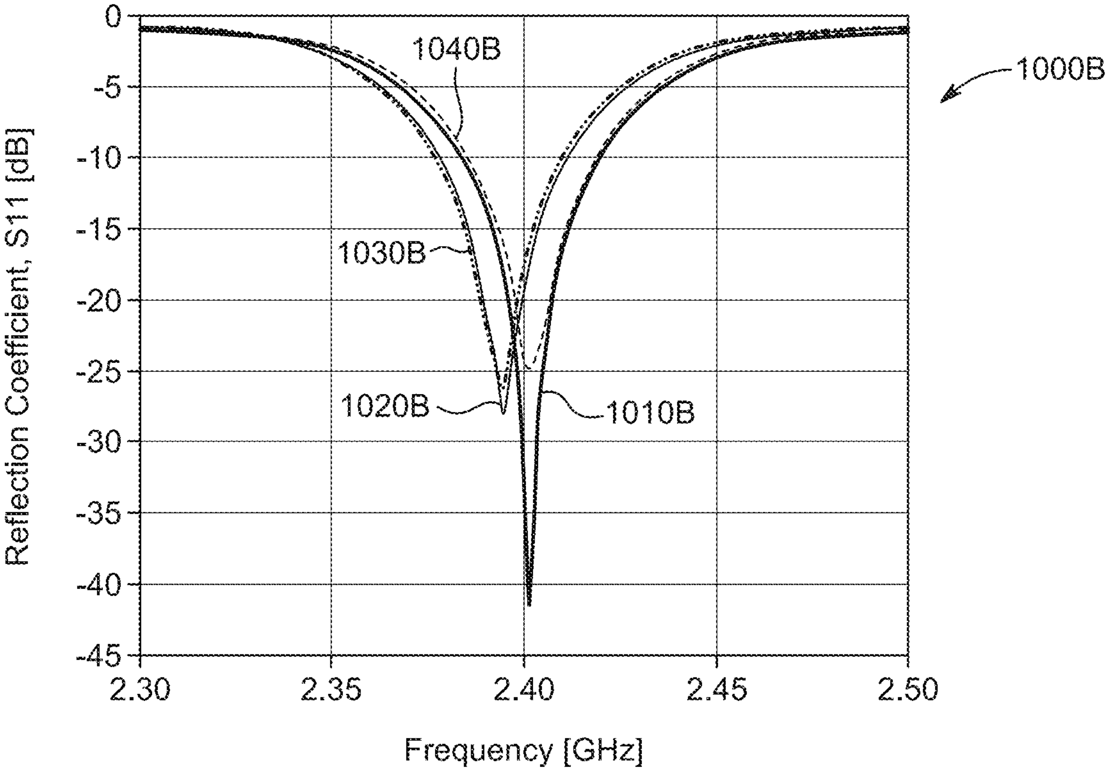

FIGS. 10A and 10B are reflection coefficient values with different bending radii, according to certain embodiments. One aspect of the described design is its flexibility. In order to measure this characteristic, the performance of the antenna system 100 was analyzed in free space under various degrees of structural deformation. FIGS. 10A and 10B show the reflection coefficient (in dBs) of the antenna system 100 when bent at different angles of curvature, around the first and the second resonant frequencies, respectively. Plot 1010A in FIG. 10A shows $S_{11}$ values of the antenna system 100 without any bending around the lower (915 MHz) resonant frequency. Plots 1020A, 1030A, and 1040A show $S_{11}$ of the antenna system 100 for bending radii of 60 mm, 70 mm, and 80 mm, respectively. Plot 1010B in FIG. 10B shows $S_{11}$ values of the antenna system 100 without any bending around the higher (2.45 GHz) resonant frequency. Plots 1020B, 1030B, and 1040B show $S_{11}$ of the antenna system 100 for bending radii of 60 mm, 70 mm, and 80 mm, respectively.

The various plots of FIGS. 10A and 10B illustrate the robustness of the antenna system 100 against curvatures of different radii in free space. Bending the antenna system 100 affects the realized resonant frequencies to a slight degree. However, even when the curvature radii are equal to 70 and 80 mm, the frequency decreases by less than 10 MHz. In contrast, excellent return loss values have been maintained below −10 dB in all of the tested scenarios.

Specific energy absorption rates (SAR) represent the amount of energy absorbed on a per unit mass basis by tissue when that tissue is exposed to an electromagnetic wave. One method of determining SAR is by measuring the increase in human body tissue temperature. As described by Penne's bio-heat transfer equation, temperature elevation and SAR are related to each other.

Figure 11B:
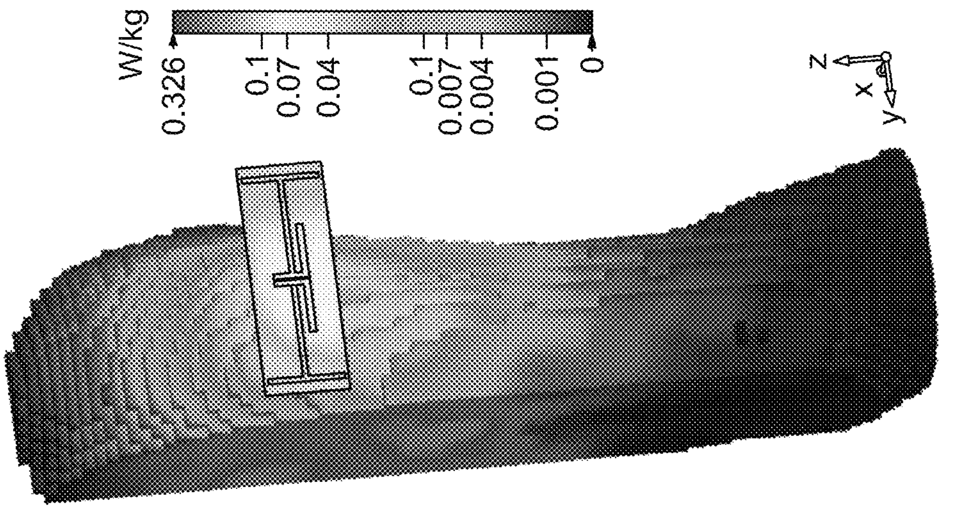
FIGS. 11A and 11B depict specific energy absorption rates attributed to a dual resonant antenna system at a specified frequency, with and without a metamaterial respectively, according to certain embodiments.
Figure 11A:
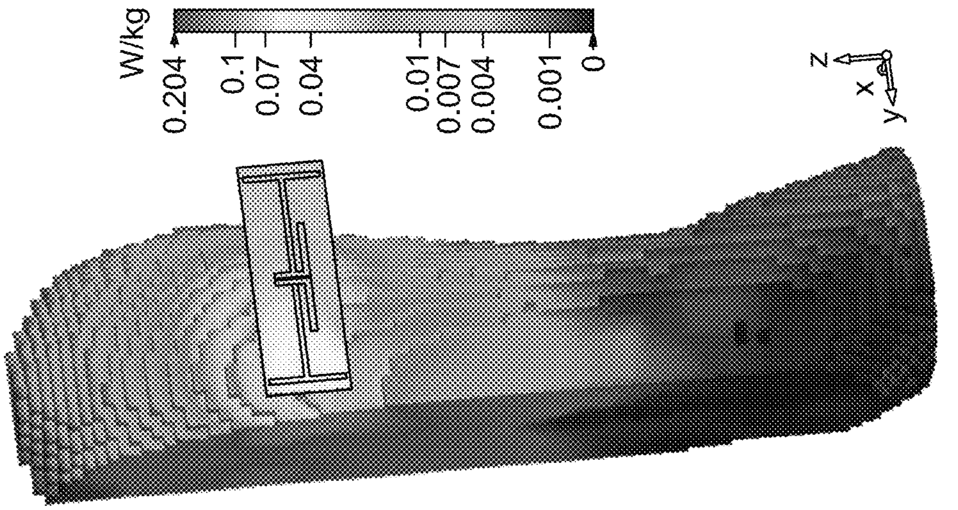

FIGS. 11A and 11B are specific energy absorption rates (SAR) attributed to a dual resonant antenna at two specified frequencies, without the disclosed metamaterial, according to certain embodiments. The SAR values have been averaged over 10 g of tissue mass and measured at the two resonant frequencies. For a first set of measurements determined with CST STUDIO SUITE® (available from Dassault Systèmes Simulia Corp. of Providence, R.I.), the antenna without metamaterial (e.g., the antenna 150) was placed 1 mm over a HUGO hand voxel model with an antenna input power of 100 mW. In this configuration, with the dual resonant antenna used alone, the measured 10 g-based SAR values at 0.9 GHz and 2.4 GHz are 0.204 W/kg and 0.326 W/kg respectively, as shown in FIGS. 11A and 11B.

Figure 12B:
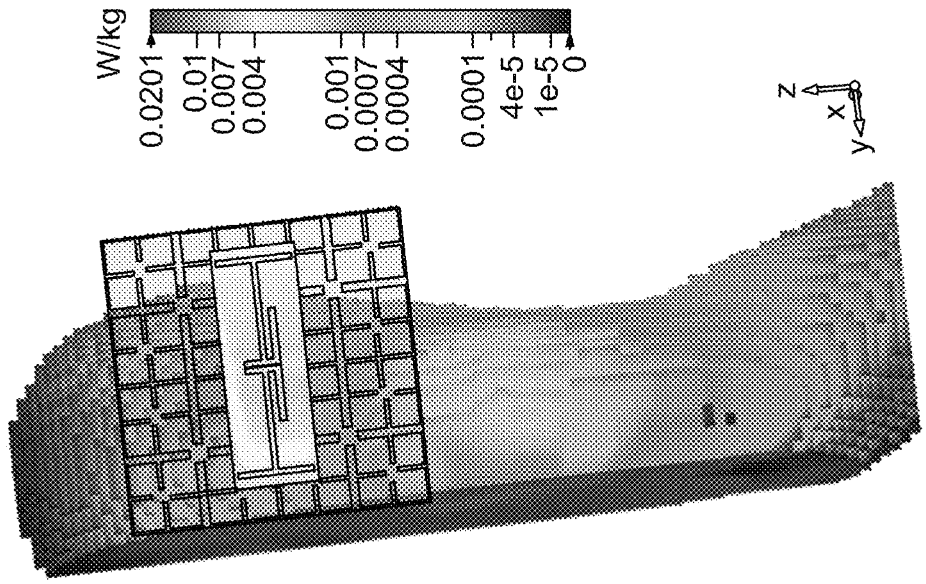
FIGS. 12A and 12B show specific energy absorption rates attributed to a dual resonant antenna system at a specified frequency, with and without a metamaterial respectively, according to certain embodiments.
Figure 12A:
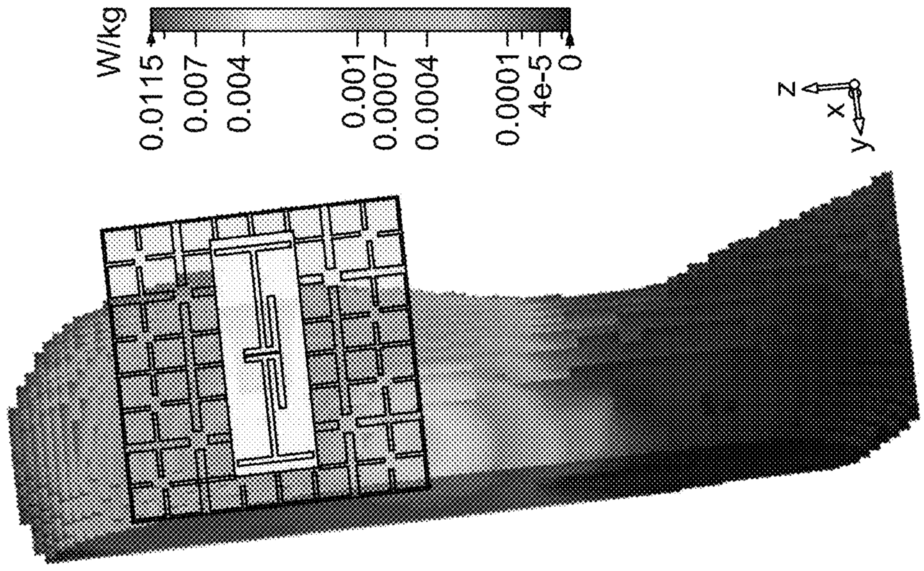

In contrast, FIGS. 12A and 12B are specific energy absorption rates (SAR) attributed to a dual resonant antenna at two specified frequencies, with the disclosed metamaterial, according to certain embodiments. When the MTM-backed antenna (such as the antenna system 100) is placed over the hand voxel model, the measured 10 g-based SAR values are 0.0115 W/kg and 0.0202 k/kg at 0.9 GHz and 2.4 GHz, respectively, as shown in FIGS. 12A and 12B.

The differences between FIGS. 11A and 11B when compared to FIGS. 12A and 12B demonstrate the benefits of adding the MTM to the resonant antenna structure 150. In doing so, the MTM allows the SAR values to remain within acceptable safety limits. For example, the resulting measurements are less than 2 W/kg, which is the maximum acceptable 10 g-based SAR, according to the IEC-62209-2 standard (published by the International Electrotechnical Commission headquartered in Geneva, Switzerland). Not only is the safety increased, but resonant antenna structure 100 with the MTM exhibits a higher gain than conventional single and dual resonance structures.

The proposed metamaterial exhibits a good reflection coefficient phase, with less backward radiation power. Thus, higher front-to-back ratio values can be achieved at the two operating frequencies compared to the single and the dual resonance structures of previous solutions. The described designs exhibit an SAR value lower than one tenth of the smallest SAR values shown in previous, conventional designs.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A resonant wearable antenna system, comprising:

a ground plane comprising a first cloth substrate and an array of metamaterial (MTM) unit cells positioned thereon, wherein at least one MTM unit cell includes four four-leaf-clover units arranged in a four-leaf-clover pattern and connected to a center unit, wherein each four-leaf-clover unit includes four leaf units arranged in a four-leaf-clover pattern and connected to a subcenter unit; and an antenna structure positioned over the ground plane, the antenna structure comprising a second cloth substrate and a conductive pattern positioned over the second cloth substrate, wherein the antenna structure is configured to have a first resonant frequency below 1 GHz and a second resonant frequency higher than the first resonant frequency, wherein the array of MTM unit cells is configured to reflect incident waves, from the antenna structure at the first resonant frequency and the second resonant frequency, in-phase.

2. The resonant wearable antenna system of claim 1, wherein the leaf units are rectangular areas defined by an MTM.

3. The resonant wearable antenna system of claim 2, wherein the respective four leaf units within each four-leaf-clover unit are asymmetric.

4. The resonant wearable antenna system of claim 3, wherein:

neighboring leaf units within a given four-leaf-clover unit have different lateral dimensions, and two non-neighboring leaf units within the given four-leaf-clover unit have identical lateral dimensions.

5. The resonant wearable antenna system of claim 2, wherein the center unit is a cross-shaped area defined by the MTM.

6. The resonant wearable antenna system of claim 5, wherein:

the center unit has a lateral dimension of 8-10 mm, the leaf units have a lateral dimension of 9-16 mm, neighboring leaf units are spaced apart from each other by 1-5 mm, and the at least one MTM unit cell has a lateral dimension of 60-80 mm.

7. The resonant wearable antenna system of claim 1, wherein the four four-leaf-clover units within the at least one MTM unit cell are asymmetric.

8. The resonant wearable antenna system of claim 1, wherein the array of MTM unit cells includes four MTM unit cells positioned adjacent to one another and arranged in two rows and two columns.

9. The resonant wearable antenna system of claim 1, wherein the array of MTM unit cells comprises an MTM that has an electrical conductivity over $1.0\times10^5$ S/m.

10. The resonant wearable antenna system of claim 1, wherein the array of MTM unit cells comprises an MTM that can be bent through at least 90 degrees without cracking or breaking.

11. The resonant wearable antenna system of claim 1, further comprising a conductive plane positioned below the first cloth substrate.

12. The resonant wearable antenna system of claim 11, wherein the array of MTM unit cells and the conductive plane comprise a same conducting material.

13. The resonant wearable antenna system of claim 1, wherein the array of MTM unit cells and the conductive pattern of the antenna structure comprise a same conducting material.

14. The resonant wearable antenna system of claim 1, wherein:

the first cloth substrate is insulating and can be bent through at least 90 degrees without cracking or breaking, and the second cloth substrate is insulating and can be bent through at least 90 degrees without cracking or breaking.

15. The resonant wearable antenna system of claim 14, wherein:

the first cloth substrate includes at least one of felt, denim, or fabric, and the second cloth substrate includes at least one of felt, denim, or fabric.

16. The resonant wearable antenna system of claim 1, wherein the first resonant frequency is in the range of 850-950 MHz, and the second resonant frequency is in the range of 2.43-2.47 GHz.

17. The resonant wearable antenna system of claim 1, wherein at least one MTM unit cell of the array of MTM unit cells comprises:

a first RLC circuit including a first resistor, a first inductor and a first capacitor serially connected, wherein the first inductor and the first capacitor form a first LC circuit; and a second RLC circuit including a second resistor, a second inductor and a second capacitor serially connected, wherein the second inductor and the second capacitor form a second LC circuit, wherein the second RLC circuit is connected across the first LC circuit by connecting the second resistor with the first inductor and connecting the second capacitor with the first capacitor.

18. The resonant wearable antenna system of claim 17, wherein:

the first RLC circuit is configured to receive a first voltage, and the second LC circuit is configured to output a second voltage.

19. The resonant wearable antenna system of claim 1, wherein the antenna structure is adhered to a central area of the ground plane.

20. The resonant wearable antenna system of claim 1, further comprising a foam material positioned between the antenna structure and the ground plane.

* * * * *